United States Patent [19]

Taylor et al.

[11] Patent Number: 4,529,296

[45] Date of Patent: Jul. 16, 1985

[54] COMBINATION SHIPPING CARTON AND LIGHT-TIGHT PHOTOGRAPHIC FILM LOADING STATION

[75] Inventors: Charles E. Taylor, Westlake Village; Stanley A. Wnukiewicz, Jr., Woodland Hills; Gary B. Krantz, Reseda; Dean S. Malinowski, Canoga Park, all of Calif.

[73] Assignee: Phase One Products Corporation, Westlake Village, Calif.

[21] Appl. No.: 512,643

[22] Filed: Jul. 11, 1983

[51] Int. Cl.³ .................... G03B 27/32; G03B 27/52
[52] U.S. Cl. .................................... 355/21; 206/316; 206/578; 354/308; 355/27
[58] Field of Search .................. 355/21, 27; 354/308, 354/312; 206/316, 578, 216

[56] References Cited

U.S. PATENT DOCUMENTS 396,573  1/1889  Johnson ........................... 354/308
788,609  5/1905  Smallwood ...................... 354/308

FOREIGN PATENT DOCUMENTS 4437 of 1898 United Kingdom ............... 354/308

Primary Examiner—Richard A. Wintercorn
Attorney, Agent, or Firm—Jack C. Munro

[57] ABSTRACT

A combination shipping carton for photographic enlarger and print developing tray assembly wherein the shipping carton can be utilized to load the developing tray assembly in a light-tight environment after removal of the enlarger and developing tray from the shipping carton. The shipping carton includes a pair of telescopingly positioned open ended boxes forming an inner box and an outer box. The inner box includes, through the sidewall thereof, an access opening assembly which is connected to a light-tight sleeve assembly through which is to be conducted the user's hands in gaining access to the interior chamber of the inner box. The outer box includes a cut-out section which can be oriented with respect to the access opening assembly to gain access to the access opening assembly. The outer box can also be located in a different position on the inner box to cover the access opening assembly, which is the normal position during shipping.

8 Claims, 5 Drawing Figures

COMBINATION SHIPPING CARTON AND LIGHT-TIGHT PHOTOGRAPHIC FILM LOADING STATION

BACKGROUND OF THE INVENTION

The field of this invention relates to photographic equipment, and more particularly to a shipping container which can be utilized in conjunction with a photographic enlarger and print developer for loading of the print developing tray with light sensitive film in a darkened environment, thereby eliminating the need for an entire darkroom facility.

The subject matter of the present invention is directed to a structure which is to be used in conjunction with an invention described within U.S. patent application Ser. No. 479,037, filed Mar. 25, 1983, entitled, COMBINED PHOTOGRAPHIC ENLARGER AND PRINT DEVELOPING TRAY.

Prior to the developing of the invention described and claimed within the aforementioned patent application, the use of a darkroom was normally a necessity to perform the photographic processes to create durable pictures from light images. The darkroom is a fixed, enclosed area, generally a room in a house or building, from which all outside light can be excluded. This darkroom requires a considerable amount of space. It is generally impractical, particularly for nonprofessional photographers, to set aside such a space for this purpose alone. The darkroom is probably the greatest obstacle from preventing people from enjoying photography as a hobby. Many dwellings, particularly apartments, are simply not large enough to allow an entire room to be continuely used as a darkroom. The part time use of a bathroom or closet necessitates bothersome and time consuming unpacking and packing of photographic equipment before and after each use.

The invention described and claimed in the aforementioned patent application permits an individual to take advantage of reproducing photograhic print and enlarged photographic prints from photographic film without necessity of constructing of a darkroom. That individual may have an extensive library of 35 millimeter photographic slides (common terminology for a photographic transparancy) and that individual may desire to reproduce a print of a particular slide. If the individual does not have a darkroom, he must then take the slides to a photographic print reproduction facility and have the print reproduced.

The structure of the aforementioned patent application includes a print developing tray. This print developing tray includes a movable cover which can be moved to an open position exposing an internal chamber of the tray and to a closed position, thereby making the tray light-tight. The tray is to be loaded within the photographic enlarger unit and the cover can be moved at the appropriate time to expose a slide onto an unexposed photograhic print which has been previously loaded within the tray. The tray is then removed from the photographic enlarger and then the print is subsequently developed.

This photographic enlarger and print developing tray is designed for "in home" use. It has been found to be necessary to load that tray with the unexposed film without the use of a darkroom. It has been found that the most perferable way to achieve this is to incorporate a "portable darkroom facility" in conjunction with the shipping carton for the photographic enlarger and print developing tray.

SUMMARY OF THE INVENTION

A combined shipping carton and light-tight photographic loading station, which takes the form of an inner box and an outer box. The inner box has an open top and a pair of access openings formed through one of the sidewalls thereof into the internal chamber of the inner box. The outer box is to be slipped over the inner box in substantially a telescopingly manner. The outer box includes an enlarged cut-out section within one sidewall thereof. The outer box has an open bottom in order to be slipped over the inner box. The outer box can be adjusted to occupy one of two different positions with respect to the inner box. In one position, a portion of the sidewall of the outer box covers the access openings of the inner box forming a completely enclosed shipping container. With the outer box located in its other position, where the pair of access openings connect with the enlarged cut-out section, access into the inner chamber of the inner box is provided through these access openings. A plastic ring is to be mounted in conjunction with each access opening through the use of a protuberance and notch assembly and is to connect in a snug, light-tight manner. A flexible cloth sleeve is to attach to each ring and extend exteriorly thereof. The outer free end of each sleeve includes a retaining collar which is to bind against an arm of a user when the user's hands have been extended through the sleeve and through an access opening to within the inner chamber. The inner chamber includes a partitioning wall. The partitioning wall facilitates location and placement of the cover to the print developing tray and also the packet of unexposed photograhic material. The user, by "feel", unaided by sight, is to place the unexposed photograhic film in its proper location within the tray and replace the cover on the developing tray, thereby not permitting light to enter into the tray.

The primary objective of the present invention is to construct a shipping carton so that it can be used as a portable darkroom facility thereby negating the need for exterior darkroom facilities when attempting to produce a photographic print from a photographic film.

Another objective of this invention is to construct a portable darkroom facility which can be manufactured quite inexpensively and therefore is available to the widest variety of economic status individuals.

Another objective of this invention is to construct a portable photographic darkroom facility which can be operated easily and quickly by even the most unskilled individual having a low degree of dexterity.

DETAILED DESCRIPTION OF THE SHOWN EMBODIMENT

Figure 1:
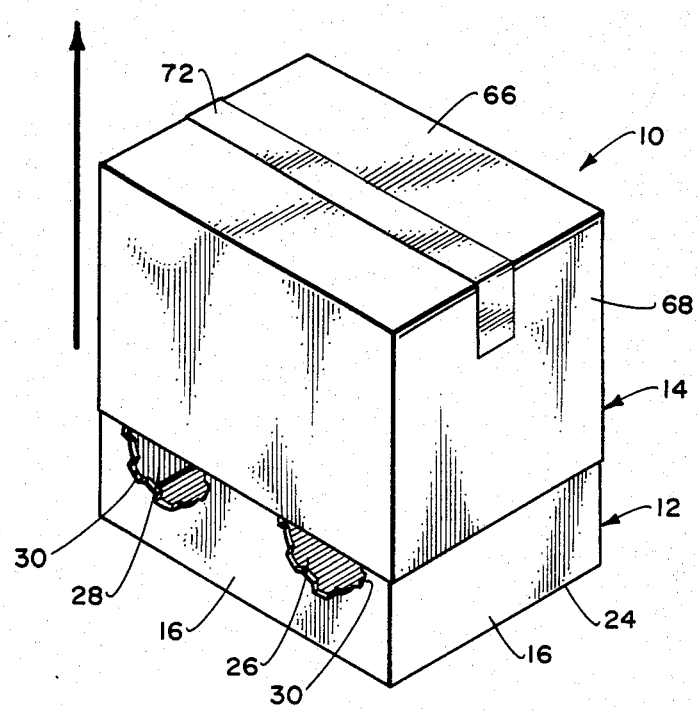
FIG. 1 is an isometric view of the shipping carton and light-tight photographic film loading station of the present invention showing the outer box of the shipping carton in a partially removed position from the inner box.

Referring particularly to the drawings, there is shown the combination shipping carton and light-tight photographic film loading station 10 of this invention which is constructed generally of an inner carton 12 and an outer carton 14. Both cartons 12 and 14 will normally be constructed of a sheet material, such as cardboard or the like.

The inner carton 12 is constructed basically of a rectangular in shape, forming four in number of connected sidewalls of a sidewall assembly 16. The upper end of each of the sidewalls terminate in a flange 18, which define therebetween an open top 20. The open top 20 connects with an inner chamber 22. The lower surface of the sidewalls of the sidewall assembly 16 are closed by a bottom 24.

Formed within one wall surface of the sidewall assembly 16 are a pair of spaced-apart access openings 26 and 28. Each of the access openings 26 and 28 are identical in size and are basically circular in shape. The periphery of each access opening 26 and 28 includes a plurality of spaced-apart notches 30. The function of these notches will be explained further on in the specification.

Mounted within the inner chamber 22 on the wall of the sidewall assembly 16, substantially opposite of the access opening 28, is a partitioning wall 32. This partitioning wall 32 is substantially Z-shaped in cross-section along a plane parallel to bottom 24. The length of the partitioning wall 32 is from directly adjacent the bottom 24 to directly adjacent the open top 20. The partitioning wall 32 forms a first chamber 34 and a second chamber 36. The function of the chambers 34 and 36 will also be explained further on in the specification.

There is to be connected to the opening 26, a plastic ring 38, with an identical in construction plastic ring 40 to connect with the opening 28. Same numerals will be utilized with respect to both rings to refer to similar parts. Each of the rings 38 and 40 include a central opening 42. Surrounding each opening 42 is a collar 44. Mounted exteriorly on the collar 44 are a series of spaced-apart protuberances 46. The protuberances 46 are divided into two circular rows forming an annular groove 48 therebetween.

The back edge of each of the rings 38 and 40 includes an annular flange 50. Located between the annular flange 50 and its directly adjacent annular row of protuberances 46 is an annular slot 52. Mounted on the surface of each protuberance 46, which forms one edge of the annular slot 52, is a tit 54.

The ring 38 is to be located within the access opening 26 so that the protuberances 46 pass through the notches 30 until the inside surface of the sidewall 16 comes into contact with the flange 50. The operator then rotates the ring 38 approximately fifteen degrees. The edge of the opening 26 is now completely located within the annulr slot 52. The function of the tits 54 is to facilitate forming of a tight connection with the sidewall 16 between the flange 50 and the first annular row of protuberances 46. This connection is to be sufficiently tight as to not permit any light to pass between the exterior surface of the ring 38 and the sidewall 16 and enter the inner chamber 22.

It is to be understood that installing of the ring 40 within the access opening 28 will be accomplished in identically the same manner as was described in respect to ring 38.

Figure 3:
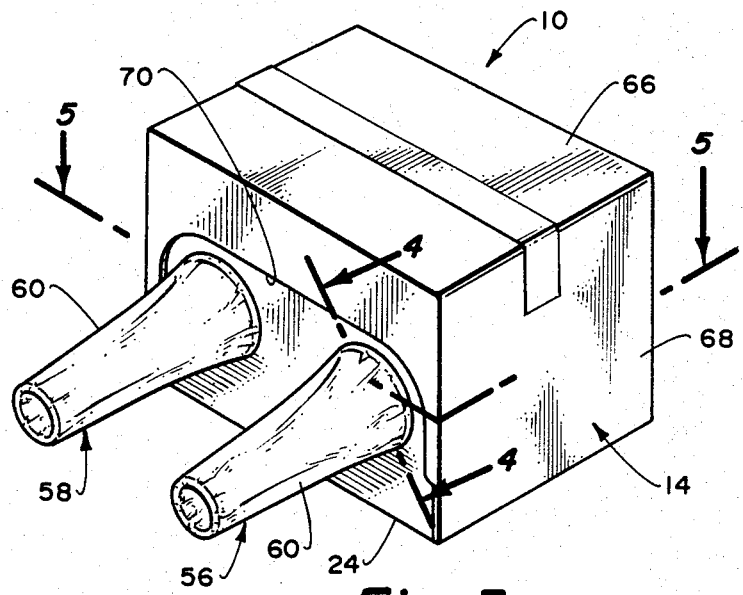
FIG. 3 is an isometric view of the shipping carton and light-tight photographic film loading station of the present invention depicting the carton as it would be used to load a print developing tray with an unexposed photographic print.
Figure 4:
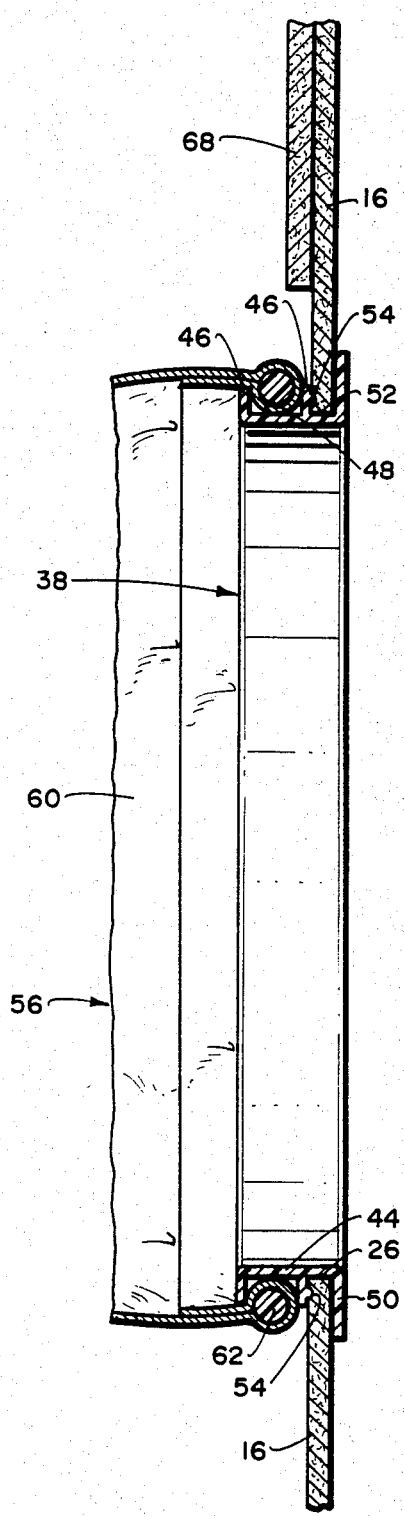
FIG. 4 is a cross-sectional view through a portion of the access opening assembly to gain access to the inner compartment of the structure of the present invention taken along line 4—4 of FIG. 3.
Figure 2:
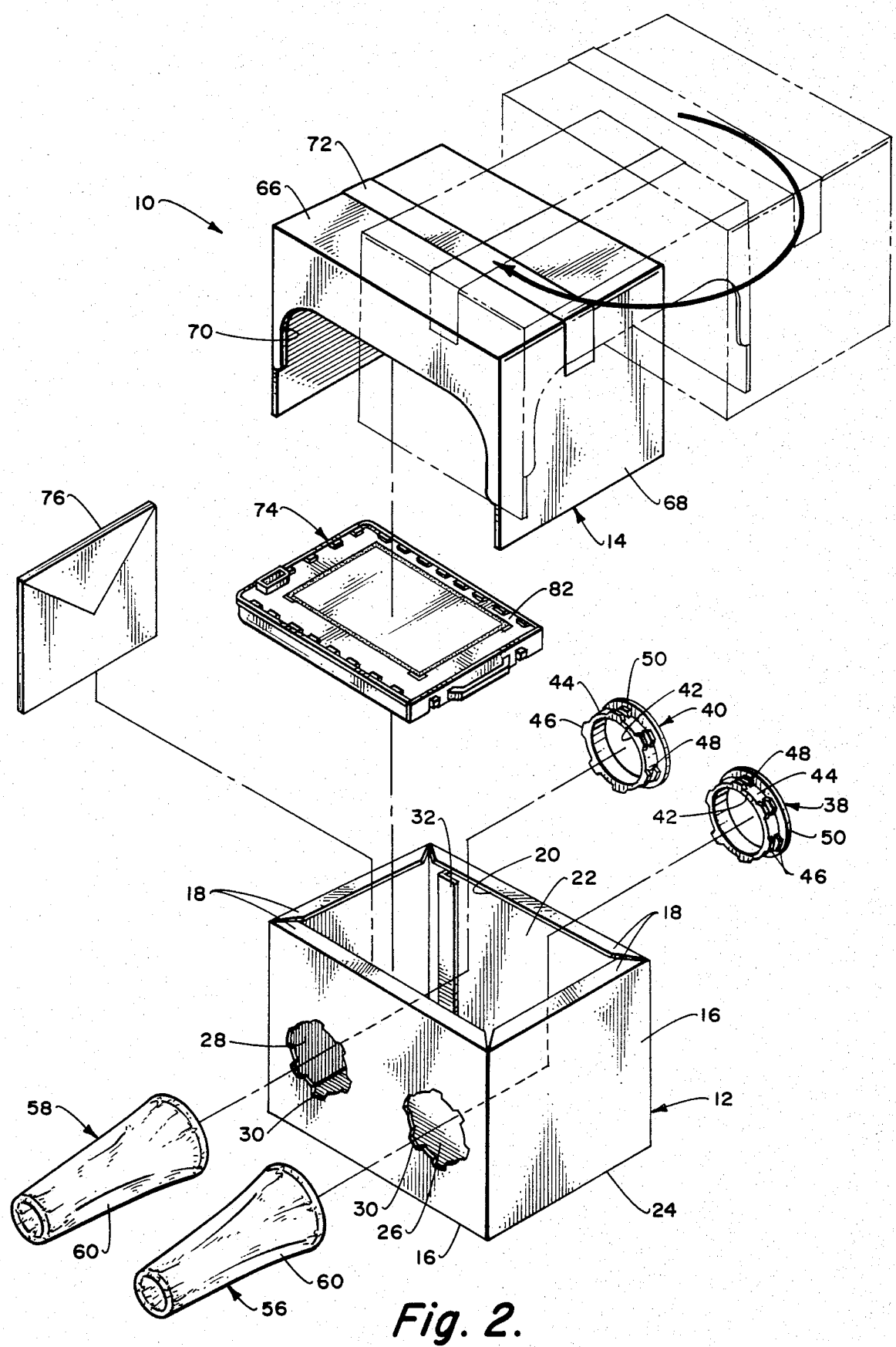
FIG. 2 is an exploded, isometric view of the entire shipping carton and light-tight photographic film loading station of the present invention.
Figure 5:
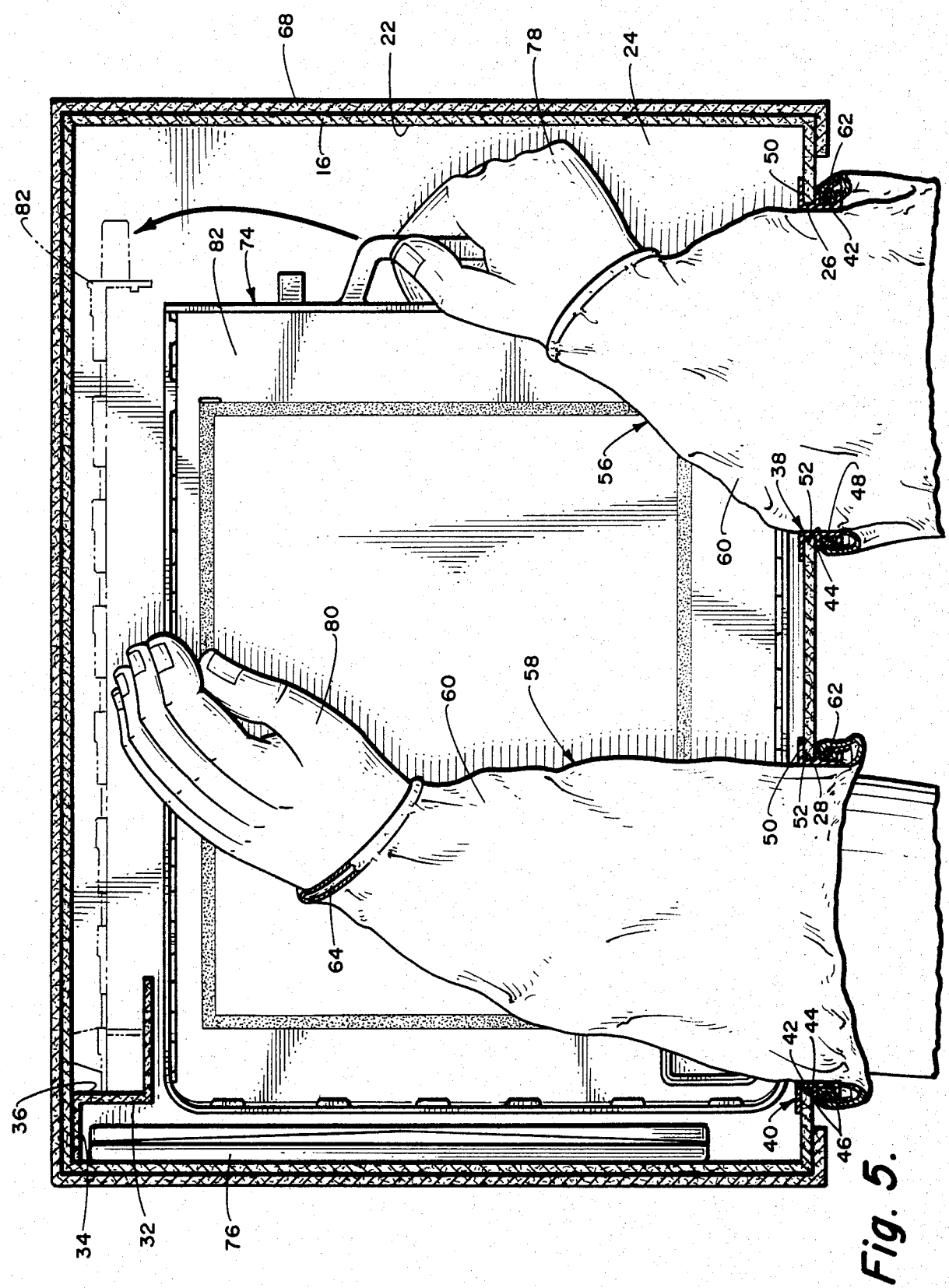
FIG. 5 is a cross-sectional view through the shipping carton and light-tight photographic material loading station taken along line 5—5 of FIG. 3 illustrating in what manner the carton would be used to load a print developing tray with an unexposed photographic print.

There is shown in FIGS. 2, 3 and 5 of the drawings, elongated cloth sleeves 56 and 58. Each of the sleeves 56 and 58 are deemed to be identical and therefore, the same numerals will be used to describe similar parts.

Each sleeve 56 and 58 includes an elongated, tubular cloth body 60. The fabric of the body 60 will normally be cotton, nylon or whatever is desired. Also, the cloth body will be constructed to be of a color to not permit the conducting of light therethrough, such as black.

Each sleeve 56 and 58 includes an elongated, tubular cloth body 60. The fabric of the body 60 will normally be cotton, nylon or whatever is desired. Also, the cloth body will be constructed to be of a color to not permit the conducting of light therethrough, such as black.

The inner end of each cloth sleeve 58 and 60 is attached to a stretchable cord 62. The stretchable cord 62 is located in the shape of a ring and defines a circular shaped opening of such a size that it can be stretched over the outer row of protuberances 46 mounted on either of the rings 38 and 40 and then be snugly located within the annular groove 48. The free end of each of the sleeves 60 is attached to a similar stretchable cord 64. The circular area defined by the cord 64 is slightly smaller than that defined by the cord 62. It is to be understood that one sleeve 56 is attached to ring 38, with the other sleeve 58 being attached to ring 40.

The outer box 14 includes a closed top 66, which is interconnected by a sidewall assembly 68 and has an open bottom. A portion of the sidewall 68 includes an enlarged cut-out section 70. Closed top 66 is formed in a conventional manner by a pair of flaps which are normally closed shut by means of a piece of opaque tape 72.

It is to be understood that the carton 10 will be utilized as a shipping carton for a combined photographic enlarger and print developing tray, which is not shown in its entirety within the drawings. The print developing tray 74 is shown only as an aid to describing of the present invention. Contained within the chamber 22 will be loosely located the rings 38 and 40 and the sleeve assemblies 56 and 58.

Upon delivery of the shipping carton 10 to the ultimate user, the user will remove the outer box 14 from inner box 16. This removal is depicted within FIG. 1 of the drawings. The sidewall assembly 68 has covered the access openings 26 and 28.

The user then removes each item that is loosely contained within the inner chamber 22 until the inner chamber 22 is empty.

The user then locates each of the rings 38 and 40 in the manner previously described within their respective access openings 26 and 28. The user then attaches each of the sleeve assemblies 56 and 58 to the respective rings 38 and 40, also previously described. The user then takes the packet of unexposed photographic film and locates such within the inner chamber 22 until one edge of the packet rests within the chamber 34 and stands in an upright position within the inner chamber 22. The user then locates the print developing tray 74 on the bottom 24, as is shown in FIG. 5 of the drawings. The user has already removed cover 82 of tray 74. The user also stands the cover 82 on edge so it extends within chamber 36.

The user then relocates the outer box 14 onto the inner box 12. However, this relocating is such that the outer box 14 is turned one hundred and eighty degrees from its previous position so that the enlarged cut-out section 70 will be located directly adjacent the access openings 28 and 30, as is shown in FIG. 3 of the drawings. At this particular time, the inner chamber 22 should be essentially light-tight. The flanges 18 assist in making this light-tight connection by the flanges 18 being slightly biased up against the inner surface of the closed top 66 of the outer box 14.

The user then inserts one hand 78 through tubular sleeve 56 until the cord 64 comes to rest at approximately the wrist area directly adjacent the hand 78. In a similar manner, the hand 80 is inserted through the sleeve 58. The user then moves the hands 78 and 80 to within the inner chamber 22, in essence turning the cloth sleeves 60 inside out.

The user by feel, since he is not able to visually observe the inner chamber 22, then removes the single, sheet of unexposed photograhic printing material from the packet 76 and places such to within the inner chamber of the tray assembly 74, which is open by previously having removed the removable cover 82. The user then closes the packet 76 and replaces it in a stand-up position within chamber 34.

The user then replaces the cover 82 by feel onto the tray assembly 74 and accomplishes such in a light-tight manner. The user then withdraws his hands 78 and 80 free of the sleeves 56 and 58, removes outer box 14 exposing the inner chamber 22. The user then removes the tray assembly 74 to be then utilized in conjunction with a photographic enlarger (not shown).

What is claimed is:

1. A combination of shipping carton and light-tight photographic film loading station comprising:
   an inner box having a first bottom and a first top connected by a first side wall forming a first inner chamber, said first top being open;
   an outer box having a second bottom and a second top connected by a second side wall forming a second inner chamber, said second bottom being open, said inner box being separable from said outer box, said inner box being locatable within said second inner chamber in either a first position or second position, said second position being one hundred and eighty degrees reversed of said first position;
   an access opening assembly formed within said first side wall, said access opening assembly permitting entry of a person's hands within said first inner chamber while preventing entry of light;
   a cut-out section formed within said second side wall; and
   with said inner box in said first position said second side wall covering said access opening assembly, with said inner box in said second position said cut-out section exposing said access opening assembly permitting access into said first inner chamber through said access opening assembly.

2. The combination as defined in claim 1 wherein:
said inner box including a partitioning wall located within said first inner chamber, said partitioning wall functioning to retain in position separate structure which is to be located within said first inner chamber, said partitioning wall facilitating blind operation of the separate structure within said first inner chamber by the hands of the user.

3. The combination as defined in claim 2 wherein:
said partitioning wall extending substantially from said first bottom to said first top.

4. The combination as defined in claim 1 including:
a ring assembly connected with said access opening assembly, said ring assembly including means facilitating light-tight connection of said ring assembly with said first sidewall assembly.

5. The combination as defined in claim 4 wherein:
said means comprising an engaging notch and protuberance assembly.

6. The combination as defined in claim 4 including:
a light-tight sleeve assembly connected to said ring assembly, whereby the operator's hands are to be conducted through said sleeves with said sleeves being fixed onto the arms of the operator with the hands of the operator then being located within said first inner chamber and said first inner chamber being totally dark.

7. The combination as defined in claim 6 wherein:
said inner box including a partitioning wall located within said first inner chamber, said partitioning wall functioning to retain in position separate structure which is to be located within said first inner chamber, said partitioning wall facilitating blind operation of the separate structure within said first inner chamber by the hands of the user.

8. The combination as defined in claim 7 wherein:
said partitioning wall extending substantially from said first bottom to said first top.

* * * * *